United States Patent
Obendiek et al.

(10) Patent No.: US 6,938,943 B2
(45) Date of Patent: Sep. 6, 2005

(54) TOP FOR A CONVERTIBLE VEHICLE (75) Inventors: Klaus Obendiek, Passau (DE); Franz Haberl, Wallerfing (DE)

(73) Assignee: Edscha Cabrio Dachysteme GmbH, Hengersberg (DE)

( * ) Notice: Subject to any disclaimer, the term of this patent is extended or adjusted under 35 U.S.C. 154(b) by 0 days.

(21) Appl. No.: 10/421,540

(22) Filed: Apr. 23, 2003

(65) Prior Publication Data

US 2003/0201658 A1 Oct. 30, 2003

(30) Foreign Application Priority Data

Apr. 24, 2002 (DE) .......................................... 102 18 241

(51) Int. Cl.[7] .................................................. B60J 7/14
(52) U.S. Cl. ................ 296/107.07; 296/108; 296/107.2
(58) Field of Search ........................... 296/107.07, 108, 296/107.16–107.17, 107.2, 121

(56) References Cited

U.S. PATENT DOCUMENTS

| | | | | |
|---|---|---|---|---|
| 3,536,354 A | * | 10/1970 | Ingram ........................ | 296/147 |
| 5,029,932 A | * | 7/1991 | Parr ............................ | 296/108 |
| 5,975,620 A | * | 11/1999 | Jambor et al. .............. | 296/108 |
| 6,019,416 A | * | 2/2000 | Beierl ..................... | 296/107.17 |
| 6,039,383 A | | 3/2000 | Jambor et al. .............. | 296/108 |
| 6,322,131 B1 | * | 11/2001 | Maass et al. ........... | 296/107.07 |
| 6,336,673 B1 | * | 1/2002 | Rothe et al. ........... | 296/107.17 |
| 6,419,295 B1 | * | 7/2002 | Neubrand .............. | 296/107.07 |
| 6,431,637 B2 | * | 8/2002 | Maass .................... | 296/146.14 |
| 6,582,009 B2 | * | 6/2003 | Wezyk et al. ............ | 296/180.1 |
| 6,592,169 B2 | * | 7/2003 | Obendiek .............. | 296/107.07 |
| 2001/0040386 A1 | | 11/2001 | Miklosi et al. ............. | 296/108 |

FOREIGN PATENT DOCUMENTS

| | | |
|---|---|---|
| DE | 19626280 | 1/1998 |
| DE | 19936252 | 2/2001 |
| DE | 19964029 | 5/2001 |
| DE | 19962070 | 7/2001 |

* cited by examiner

Primary Examiner—Dennis H. Pedder
(74) Attorney, Agent, or Firm—Davidson, Davidson & Kappel, LLC

(57) ABSTRACT

A top for a convertible vehicle having a vehicle body. The top includes a roof part held movably on the vehicle body and moveable from a closed state to an open state, a rear window element having a side, and a pillar element disposed on the roof part and disposed at the side of the rear window element in the closed state of the roof part. The pillar element is inwardly pivotable relative to the roof part toward a center of the vehicle.

14 Claims, 9 Drawing Sheets

TOP FOR A CONVERTIBLE VEHICLE

Priority is claimed to German Patent Application No. DE 102 18 241.8-21, filed on Apr. 24, 2002, which is incorporated by reference herein.

BACKGROUND INFORMATION

The present invention relates to a top for a convertible vehicle, comprising an openable roof part, which is held movably on the vehicle body, and a rear window element, with a pillar element, which, at least in a closed state of the top, is arranged laterally on the rear window element, being provided on the roof part.

In the construction of modern convertible vehicles, a series of developments exist making it possible for a multipart hard-shell top, which, in a closed state of the top, is arranged in front of the passenger region of the vehicle in the form of a fixed roof, to be automatically deposited in a rear region of the vehicle in a space-saving manner. Basically, in the case of tops of this type, there is the problem that the inflexible shell parts mean that, in the opened and deposited state, they take up more space than a conventional top having a flexible fabric. The result of this is that the possibilities for shaping hard-shell tops of this type are limited.

German Patent Document No. DE 196 34 510 C1 describes a top for a convertible vehicle, said top comprising two dimensionally stable shell parts, with the rear shell part, in a closed state of the top, at the same time forming C pillars of the roof. A fixed rear window, which can be pivoted separately from the two shell parts, is arranged between the C pillars. In this case, the C pillars are drawn back behind the essentially vertically arranged rear window so as to achieve a sporty appearance for the vehicle. In an opened state of the top, the rear shell part, which comprises the C pillars, is pivoted essentially through 180° in its position, with a linkage supporting the roof parts being designed in such a manner that the collapsed roof in the deposited state is displaced forward, this displacement assisting in keeping a loading volume free in the rear region of the vehicle. A disadvantage here is that the C pillars, which, because of their design, are particularly wide in their base region in the direction of travel, protrude, in the deposited state of the top, laterally into the rear passenger region, with the result that cover panels to be provided for them cause the width of the rear passenger seats to be restricted. In addition, limits are placed on the formation of the fin-like C pillars by the fact that these wide C pillars must not collide with the rear wheel arches of the vehicle during the opening movement of the top.

SUMMARY OF THE INVENTION

It is an object of the present invention to improve a top for a convertible vehicle to the effect that the shaping of the top is subject to few restrictions.

A top for a convertible vehicle according to the present invention comprises an openable roof part which is held movably on the vehicle body, a rear window element, and a pillar element, which, at least in a closed state of the top, is arranged at the side of the rear window element, wherein said pillar element is provided on the roof part, wherein the pillar element is designed in a manner such that it can be pivoted inwards relative to the roof part and in a direction of the center of the vehicle.

An effect achieved by the pivotability of the pillar elements relative to the roof part is that the pillar elements can be designed to be virtually as wide as desired in the direction of travel, since, in the course of the pivoting movement, they are brought out of any collision region with wheel arches or else with the rear passenger region.

The top according to the present invention preferably comprises a positively controlled linkage having a first and a second main link, the main links each being connected pivotably to the vehicle body in the region of a main bearing unit. A four-bar linkage, which is preferably formed by the roof part, the first main link, the second main link and the vehicle body, makes it possible, in a simple manner, to deposit the roof part in the rear region of the vehicle and, at the same time, to articulate further roof parts, in particular the pillar element, utilizing the relative movement of the two pivotable main links.

In a preferred embodiment of a top according to the present invention, the roof part comprises a coupling link and a fixed shell part, which is fixed on the coupling link. In addition, a front roof part is preferably provided, the front roof part, the coupling link and a first front roof link and a second front roof link together forming a front four-bar linkage of the positively controlled linkage, and it being possible for the front four-bar linkage to be driven by means of a control link, which is articulated on the second main link, and by means of two intermediate links. The overall result of this is the formation of a positive control means, in which the front roof part, which forms the coupling element of the front four-bar linkage, is moved over the roof part by means of the pivoting of the front four-bar linkage.

In a further preferred embodiment of a top according to the present invention, a front roof part is provided, the front roof part being movable over the roof part by means of a sliding guide. The sliding guide comprises a rail, which is fixed on the roof part, and front links which are guided in each case in the rail and are articulated on the front roof part. By this means, the front roof part is moved over the central roof part essentially by a translation movement, with the result that the entire top takes up a particularly small amount of height during its opening movement.

The pillar element of a top according to the present invention is preferably connected at least indirectly to the roof part by means of a link mechanism, it being possible for the pivoting of the pillar element to be driven by the link mechanism. The link mechanism is particularly preferably comprising a three-dimensional coupling rod, making it possible, in a simple manner, for the pillar element to be pivoted about an axis located obliquely in space, the pivoting movement being driven by a relative movement of further linkage parts of the top according to the present invention.

As an alternative to this, the pivoting of the pillar element can also be driven by means of a driving device provided in addition. This advantageously enables the pillar element to be completely pivoted independently of a further movement of the top.

In a further alternative embodiment of a top according to the present invention, a second pillar element part is provided in the region of the pillar element, the second pillar element part being connected fixedly to the roof part. The effect which can advantageously be achieved by this means is that, although, for static reasons, there is a pillar element part which is connected fixedly to the roof part but is of relatively narrow design, nevertheless the pivotable pillar element according to the present invention enables the top to be deposited in a particularly favorable manner.

The rear window element of a top according to the present invention is particularly preferably orientated essentially vertically. In addition, the rear window element is preferably mounted in a box-type receptacle in a manner such that it can be driven and displaced, the box-type receptacle being arranged in a region behind the rear passengers. This ensures, in a simple manner, that the rear window element can be moved away from the roof part and the pillar elements, by means of an essentially vertical displacement into the box-type receptacle, before the opening movement of the further parts of the top begins. In addition, while driving with the top in the closed state, this also enables a further attractive possibility for ventilating or loading the vehicle by lowering the rear window element into the box-type receptacle. In addition, the advantage thus arises of it being possible to move the rear window upward as a windbreak when the top is completely open.

Seals 4a (see FIG. 9) for sealing the rear window element on the top are preferably at least partially provided on the pillar element. In particular, this relates to lateral, essentially vertically aligned seals, in which the rear window is guided in a displaceable manner.

Further features and advantages of the top according to the present invention emerge from the exemplary embodiments described below and from the claims.

BRIEF DESCRIPTION OF THE DRAWINGS

Two preferred exemplary embodiments of a top according to the present invention will be described below and explained in greater detail with reference to the attached drawings.

DETAILED DESCRIPTION OF A PREFERRED EMBODIMENT

Figure 1:
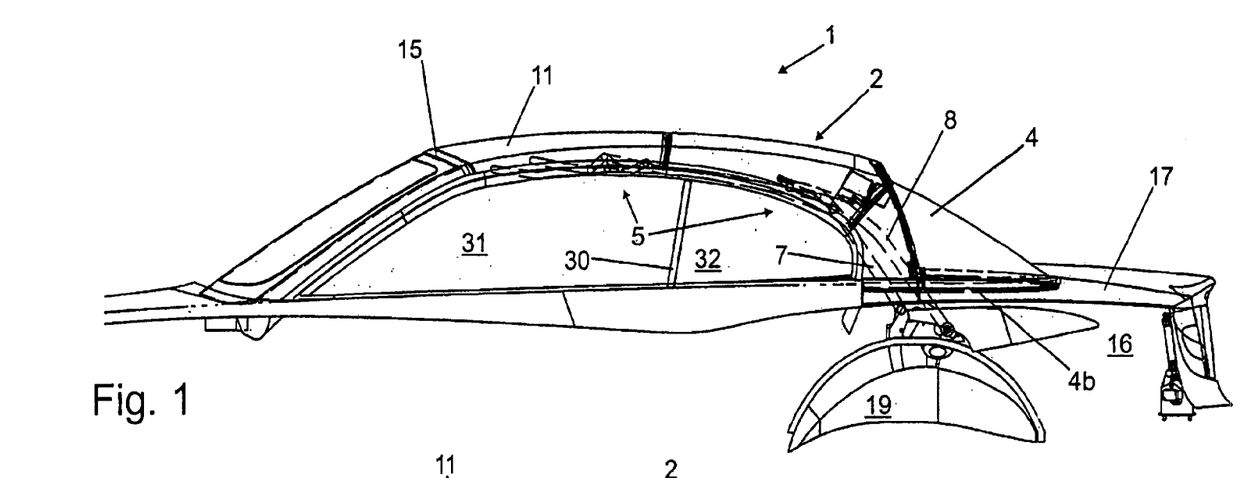
FIG. 1 shows a first exemplary embodiment of a top according to the present invention in a closed state, in a schematic plan view from the side.

FIG. 1 to FIG. 10 illustrate a first exemplary embodiment of a top according to the present invention. FIG. 1 shows that the top 1 comprises a roof part 2, a pillar element 4 and a front roof part 11. In the illustrated, closed state of the top, the top 1 is fixed releasably on an immovable windshield frame 15 of the vehicle by means of the front roof part 11. The front roof part 11 is adjoined on the rear side by the roof part 2, which essentially covers the rear region of the passenger compartment. The roof part 2 is adjoined on its rear side by a pillar element 4, the pillar element 4 being fixed on the roof part 2 in a manner such that it can pivot relative to the roof part 2 by means of a hinge 13c (see FIG. 10). The pillar element 4 forms a C pillar of the top according to the present invention. In particular, this C pillar is designed to be particularly long in the direction of travel in its base region 4b. A rear window element 3 is provided between the pillar elements 4, which are arranged in each case on the left-hand side and right-hand side of the vehicle (see FIG. 9).

Figure 9:
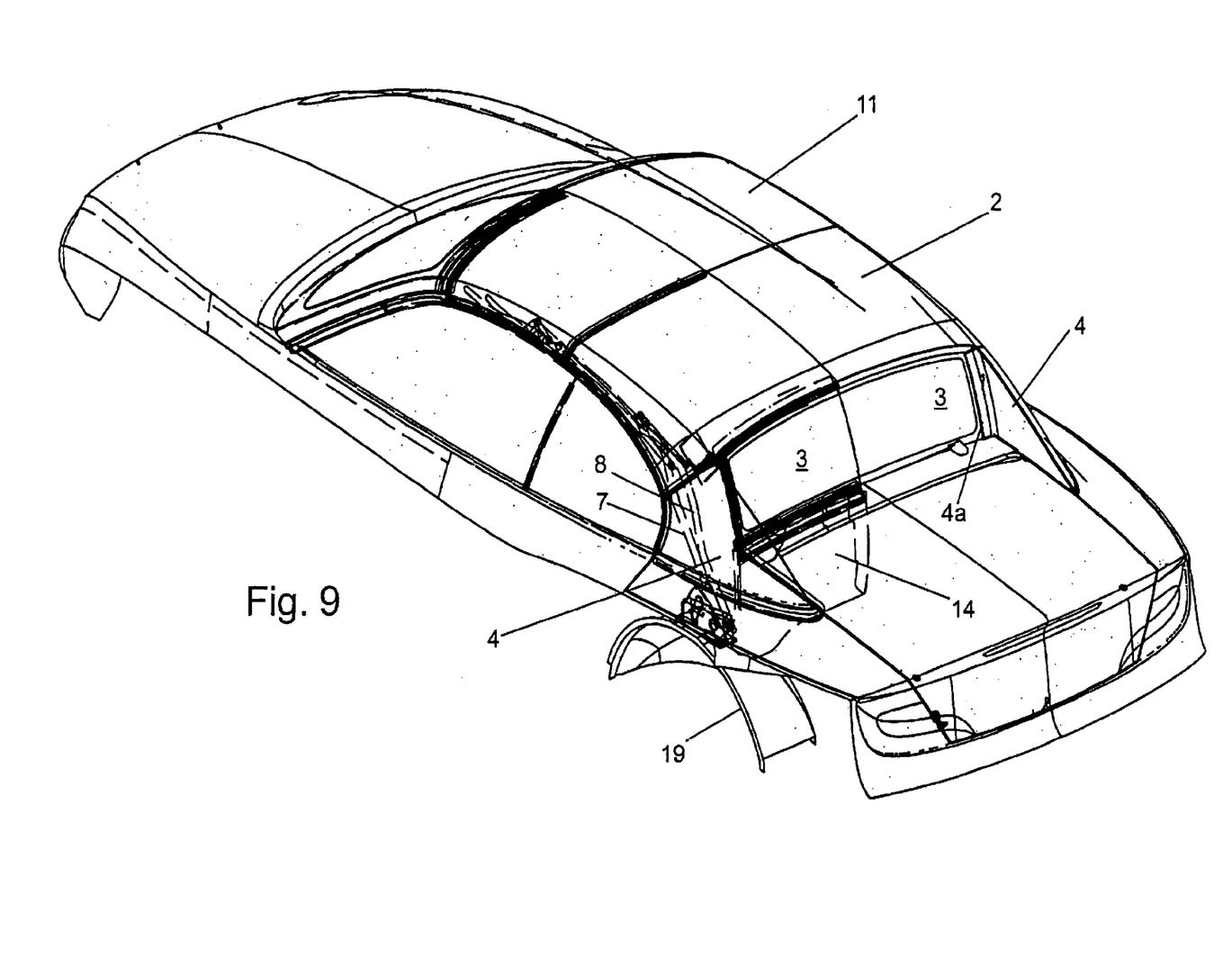
FIG. 9 shows the top from FIG. 1 in a three-dimensional illustration obliquely from the rear.

As can be seen on the basis of the three-dimensional illustration from FIG. 9 in particular, in a closed state of the top, the pillar elements 4 form fins which project rearward over the rear window element 3 giving the vehicle a particularly sporty appearance. It can likewise be seen from FIG. 9 that the rear window element 3 is shaped such that it is slightly curved and is arranged essentially vertically, with it being possible for it to be lowered into a box-type receptacle 14. The box-type receptacle 14 is arranged below the rear window element 3 and behind the rear passenger seats. The rear window element 3 is held driveable on the box-type receptacle 14 in a known manner by means of rail guides and driven cables. The rear window element 3 remains essentially in the same plane while being lowered in the course of an opening movement of the top.

The roof part 2 and the front roof part 11 are each fixed on a positively controlled linkage 5. In this case, a respective linkage, which is in each case of symmetrical design, extends in each edge region of the vehicle roof, with, in a closed state of the top, an essentially curved profile arising along the insides of the lateral roof edges. As can be seen in particular from FIG. 3, the linkage 5 comprises a first main link 7 and a second main link 8 which are both articulated at a distance from each other on the vehicle body in the region of a main bearing unit 9.

Figure 3:
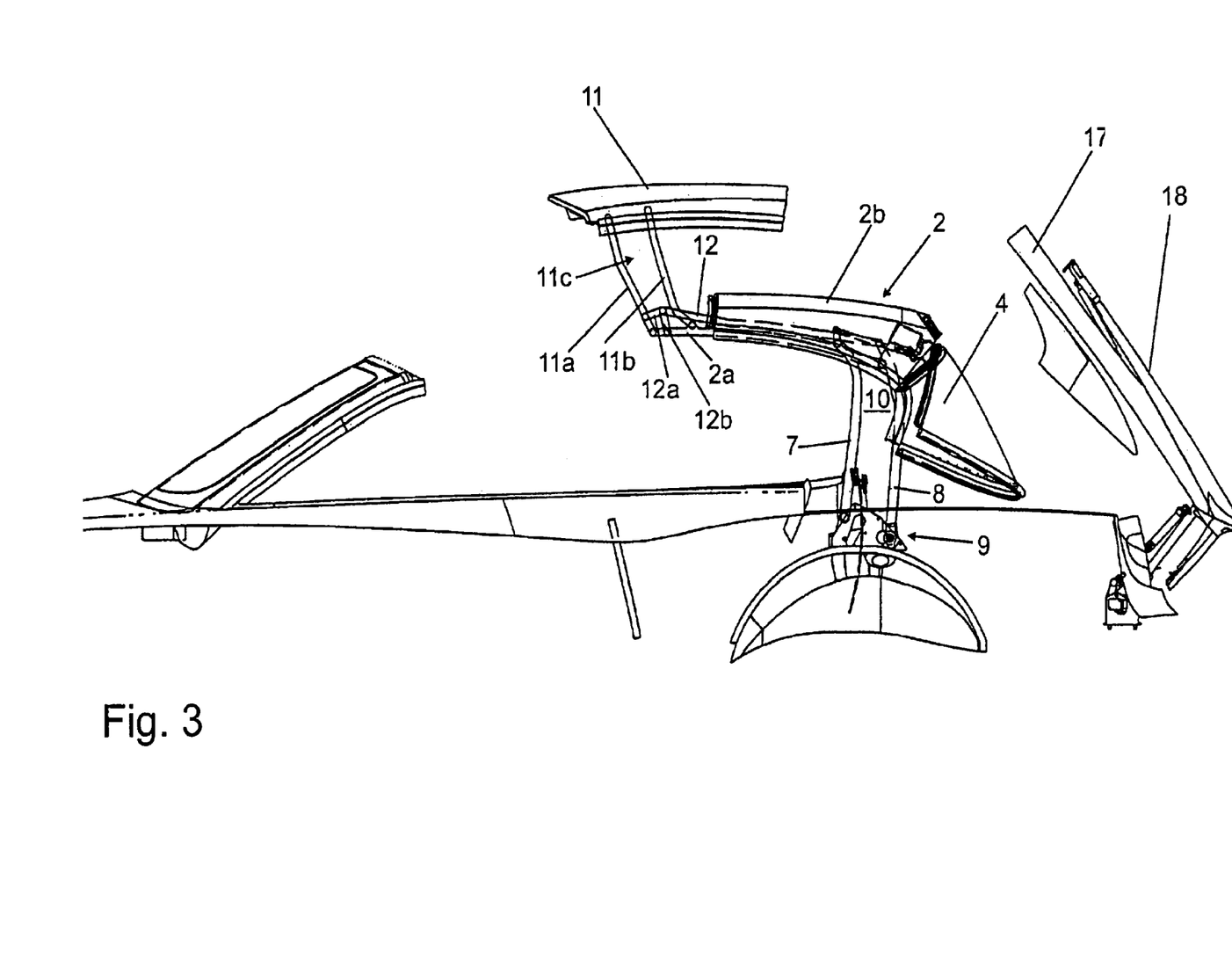
FIG. 3 shows the top from FIG. 1 in a second step of an opening movement.
Figure 4:
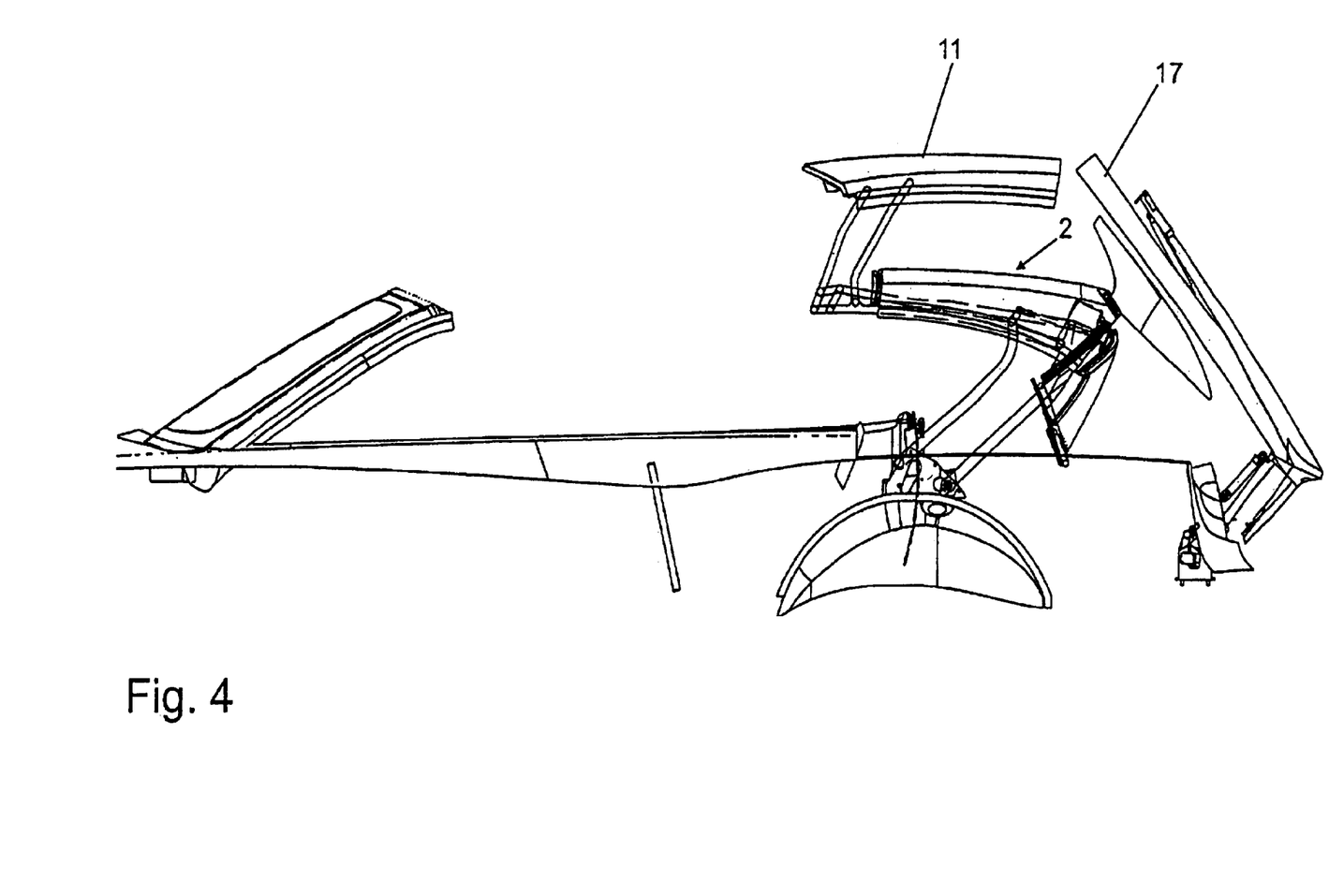
FIG. 4 shows the top from FIG. 1 in a third step of an opening movement.
Figure 5:
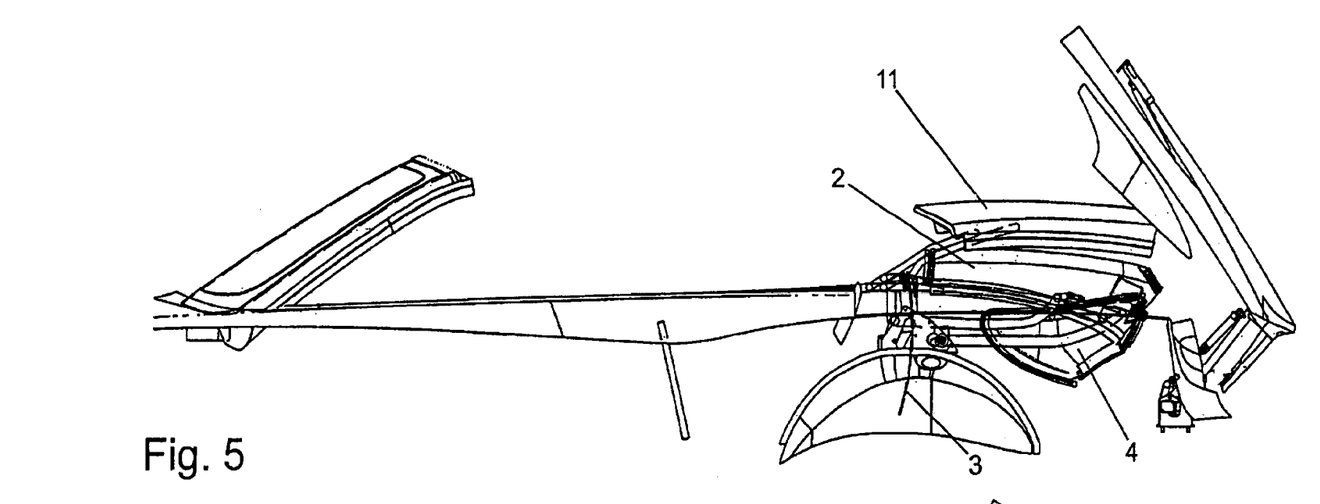
FIG. 5 shows the top from FIG. 1 in a fourth step of an opening movement.

A coupling link 2a forms a four-bar linkage 10 together with the two main links 7, 8 and the vehicle body. The roof part 2 is formed by the coupling link 2a and by a rigid shell part 2b fixed on the coupling link 2a. A first front link 11a and a second front link 11b rest in an articulated manner on the coupling link 2a, with a front four-bar linkage 11c being formed by the coupling link 2a, the two front links 11a, 11b, and the front roof part 11, which is articulated on each of the two front links 11a, 11b. This front four-bar linkage 11c is activated by means of a control link 12, which is articulated on the second main link 8, and by means of two intermediate links 12a, 12b. Owing to the fact that the control link 12 is not connected directly to one of the front links 11a, 11b, but rather the one intermediate link 12a connects the control link 12 to the front link 11a and the other intermediate link 12b connects the control link 12 to the coupling link 2a, a particularly large pivoting angle of the front four-bar linkage 11c is made possible during the positively controlled opening movement of the top.

Figure 10:
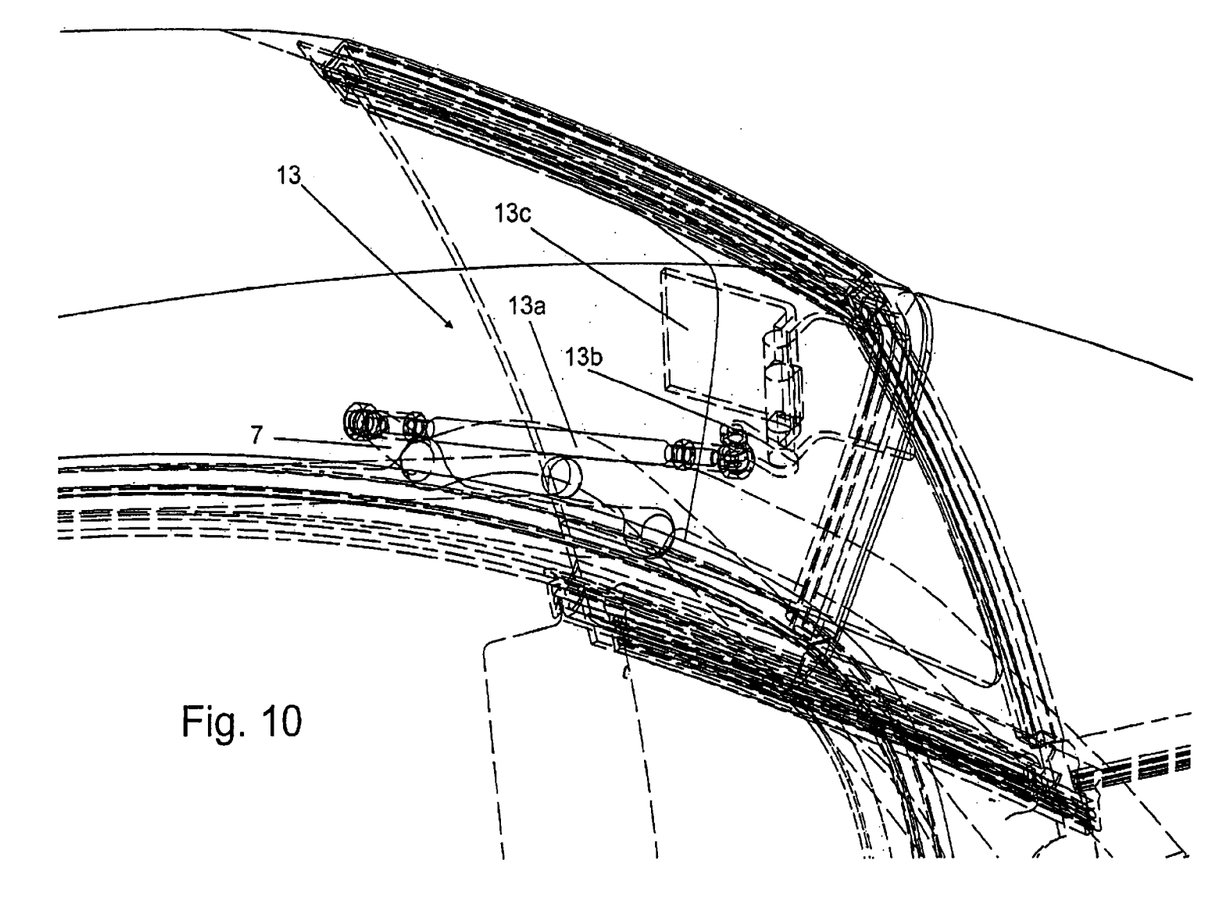
FIG. 10 shows a view of a detail of the top from FIG. 1.
Figure 11:
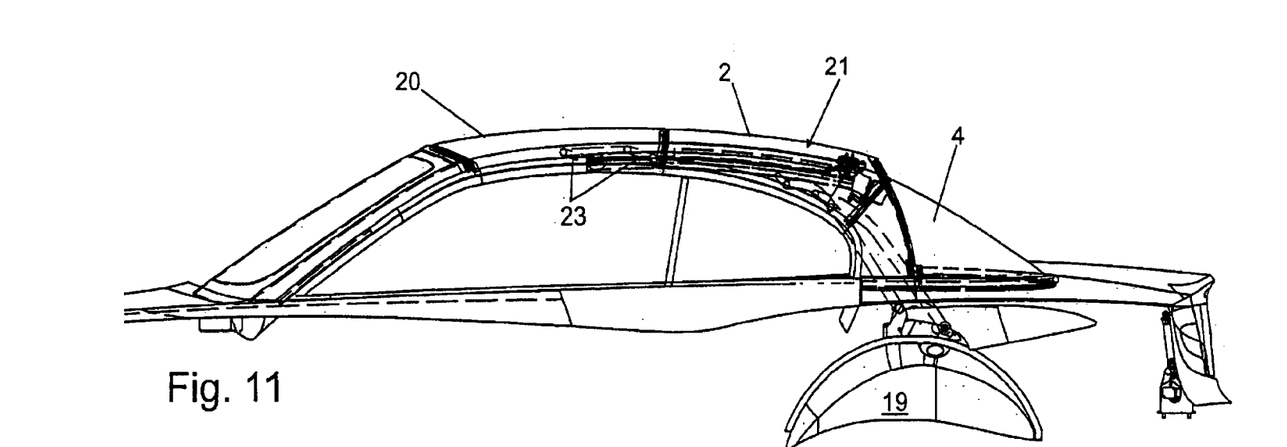
FIG. 11 shows a second exemplary embodiment of a top according to the present invention in a closed state, in a schematic plan view from the side.
Figure 12:
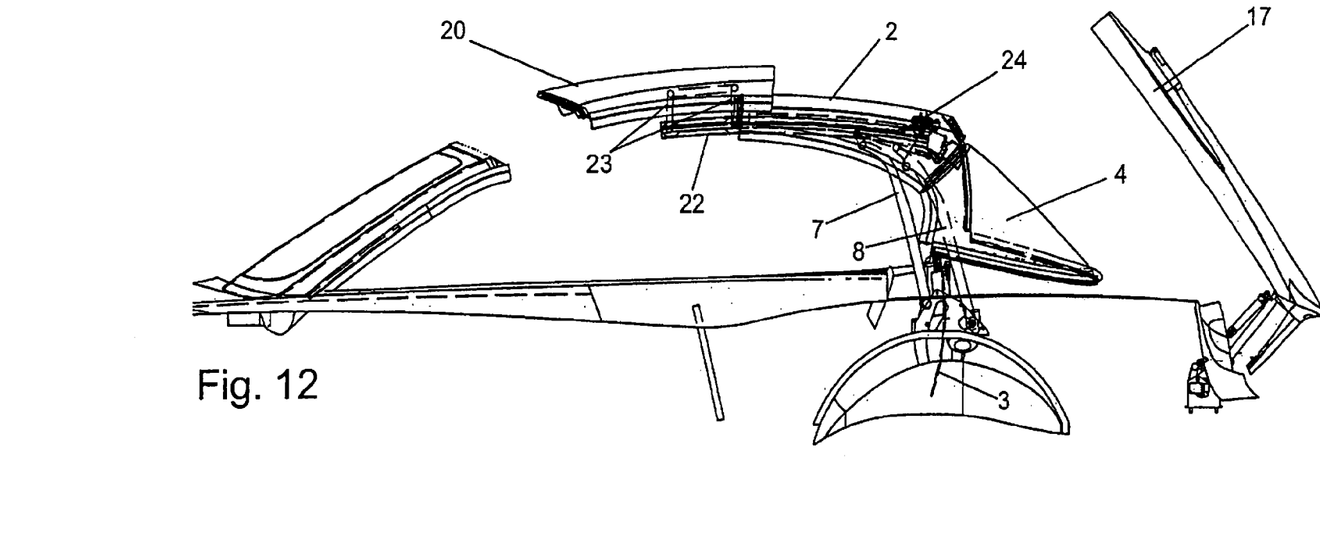
FIG. 12 shows the top from FIG. 11 in a first step of an opening movement.
Figure 13:
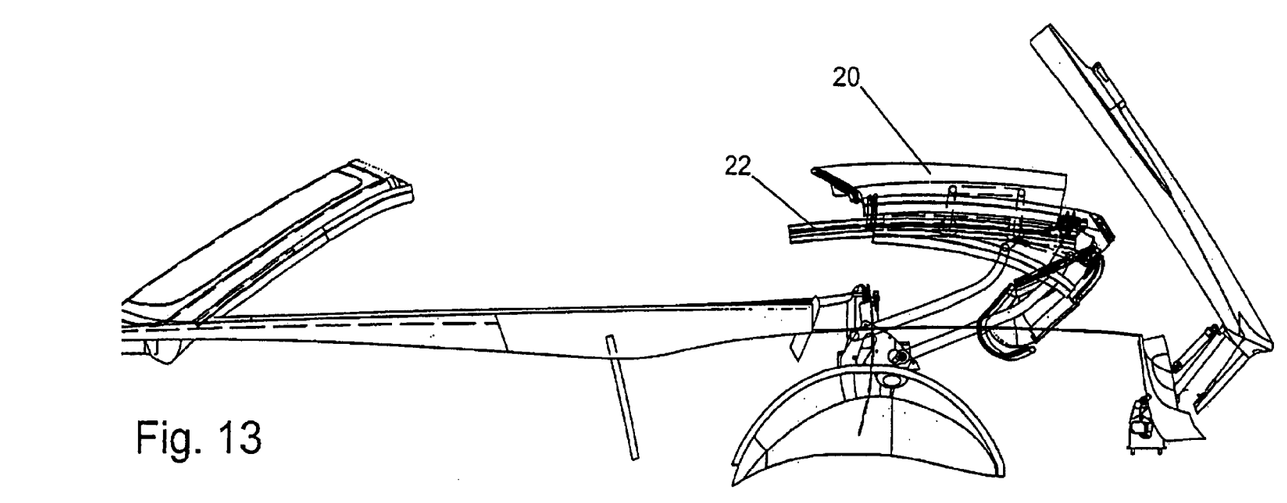
FIG. 13 shows the top from FIG. 11 in a second step of an opening movement.
Figure 14:
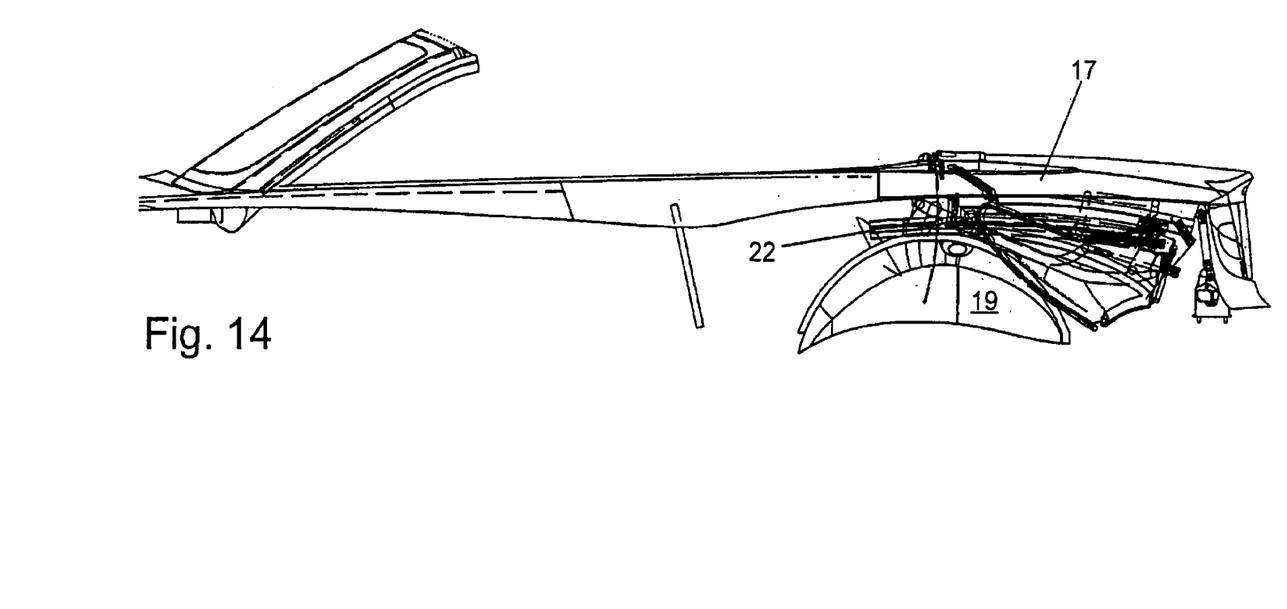
FIG. 14 shows the top from FIG. 11 in a state in which it is completely open and deposited in a rear region of the vehicle.

As can be seen in particular from the illustration of the detail according to FIG. 10, a link mechanism 13, with which the pillar element 4 can be pivoted relative to the roof part 2, comprises a three-dimensional coupling rod 13a which is articulated at one end on an extension of the first main link 7 and at the other end on a hinge lever 13b, which is connected to the hinge 13c. The articulation takes place by means of ball-headed joints in order thereby to provide the degrees of freedom necessary for the three-dimensional movement of the coupling rod 13a. Since the first main link 7 is pivoted relative to the roof part 2 in the course of an opening movement of the top, this relative movement can therefore be used, by transferring the movement by the coupling rod 13a, in order to pivot the pillar element 4 relative to the roof part 2.

Figure 2:
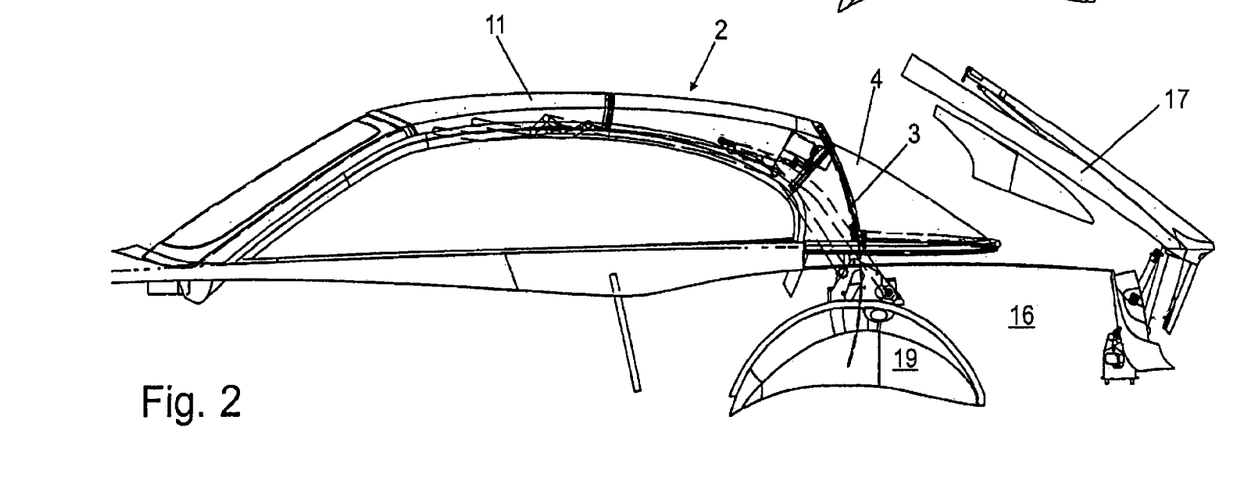
FIG. 2 shows the top from FIG. 1 in a first step of an opening movement.

As can be seen from FIG. 2 in particular, a rear lid element 17 is provided, which element covers a rear region 16 of the vehicle and can be pivoted up counter to the direction of travel so as to make it possible to deposit the top in the rear region 16 of the vehicle. A trunk lid 18, which can be pivoted up in the direction of travel, is mounted in a known manner on this rear lid element 17.

B pillars 30 of the vehicle are arranged between front and rear side windows 31, 32 and can be lowered together with the side windows in the course of an opening movement of the top by means of a separate driving device (not illustrated), in order thereby to obtain a complete convertible in the open state of the top.

The present invention functions as follows:
Starting from the closed state of the top according to FIG. 1, the rear lid element 17 is initially pivoted up counter to the direction of travel (see FIG. 2). The rear window element 3 is also retracted downward into the box-type receptacle 14.

After the rear lid element 17 has been opened and the rear window element 3 has been lowered, a linear force-introducing unit (not illustrated) is used to exert a force on the two main links 7, 8, with the result that the latter pivot in the clockwise direction (see FIG. 3). By means of the linkage 5, which is positively controlled in its entirety, the front roof part 11 is pivoted in the clockwise direction over the roof part 2, and the roof part 2, which forms a connecting element of the four-bar linkage 10, is pivoted into the rear region of the vehicle with its three-dimensional orientation essentially being retained. Owing to the previously described coupling of the pillar element 4 to the positively controlled linkage 5 by the link mechanism 13, during this opening movement the pillar element 4 is pivoted inward relative to the roof part 2 about an axis located obliquely in space. This pivoting of the pillar element 4 inward takes place in the direction of the center of the vehicle, with the result that the pillar element 4, when completely pivoted inward, comes to lie essentially below the roof part 2.

Figure 6:
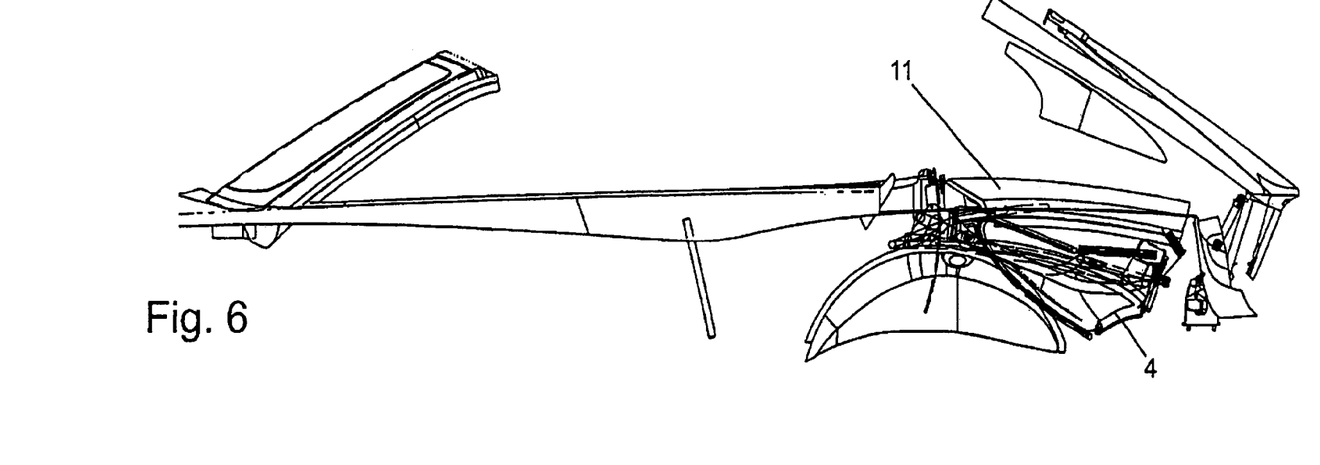
FIG. 6 shows the top from FIG. 1 in a fifth step of an opening movement.
Figure 7:
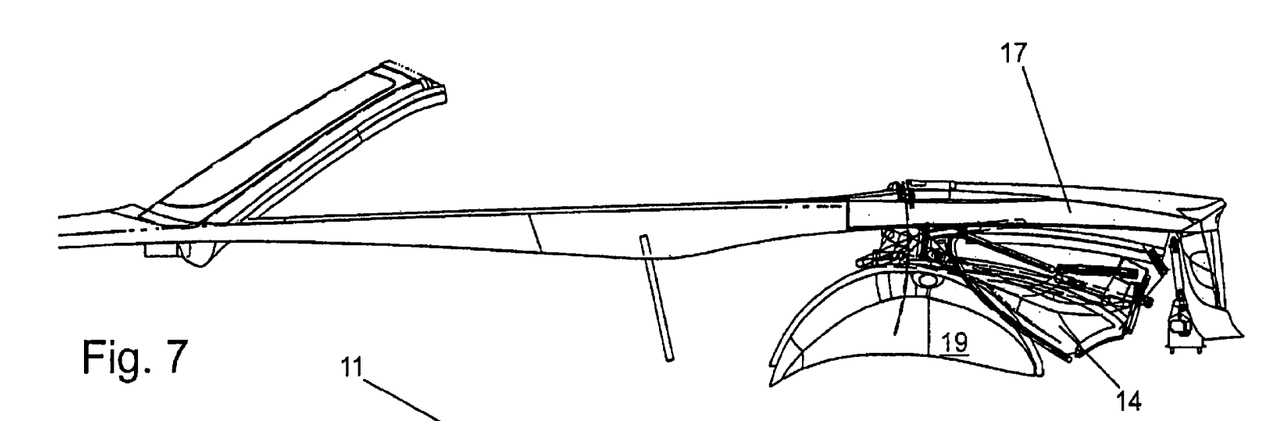
FIG. 7 shows the top from FIG. 1 in a state in which it is completely open and deposited in the rear region of the vehicle.

From the lateral views of the deposited position of the top according to the present invention, which views are shown with an open rear lid element 17 in FIG. 6 and with a closed rear lid element 17 in FIG. 7, it is clear that the previously described pivoting movement of the pillar element 4 makes it possible for the top to be deposited in the rear region 16 of the vehicle in such a manner that the deposited top 1 does not collide with wheel arches 19 of the vehicle and takes up very compact packing dimensions.

Figure 8:
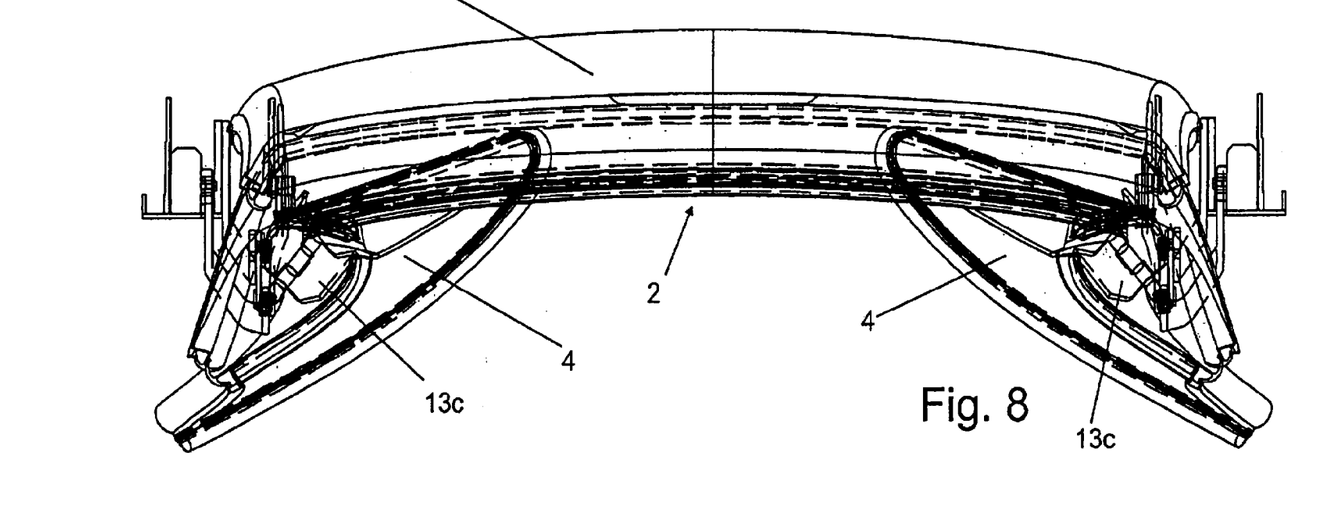
FIG. 8 shows the top from FIG. 7 in a schematic plan view from the rear.

From the plan view of the deposited top 1 from the rear according to FIG. 8, it can be seen that the previously described pivoting movement of the pillar elements 4 results in a particularly favorable, remaining loading volume which is not restricted in terms of its height in a central region by the pillar elements 4 which have been pivoted inward.

A second exemplary embodiment of a top according to the present invention is illustrated in FIG. 11 to FIG. 14. There is no difference from the first exemplary embodiment described in respect of the previously described pivoting and activation according to the present invention of the pillar elements 4. However, in contrast to the first exemplary embodiment described, a front roof part 20, which is connected to the roof part 2 via a sliding guide 21, is provided. The sliding guide 21 comprises a rail 22, which is fixed on the roof part 2, and also two front links 23, which are mounted on rollers in the rail 22 on one side and on the other side are in each case fixed in an articulated manner on the front roof part 20. In addition, in order to drive a displacement of the front roof part 20 over the roof part 2, a driving device 24 is provided in the rear region of the sliding guide 21, said driving device being formed in a manner known per se by means of an electric motor and driven cables.

The opening movement of the top according to the second exemplary embodiment described takes place in respect of the roof part 2, the pillar element 4 and the two main links 7, 8 in the same manner as in the first exemplary embodiment. The only difference is that the movement of the front roof part 20 relative to the roof part 2 is now an independent movement which is driven by means of the driving device 24. In this case, on initiation of the movement of the front roof part 20 relative to the roof part 2, the front roof part 20 is first of all raised by means of the front link 23 in order then to be slid over the roof part 2 by means of a displacement of the front link 23 along the rail 22.

What is claimed is:
1. A top for a convertible vehicle having a vehicle body, comprising:
　a roof part held movably on the vehicle body and moveable from a closed state to an open state;
　a rear window element having a side and being oriented essentially vertically in the closed state of the roof part;

a hinge;

a pillar element disposed on the roof part and disposed at the side of the rear window element in the closed state of the roof part, the pillar element being inwardly pivotable relative to the roof part toward a center of the vehicle using the hinge; and a link mechanism operably connecting the pillar element to the roof part and configured to drive a pivoting of the pillar element.

2. The top as recited in claim 1, further comprising a positively controlled linkage configured to deposit the roof part in a rear region of the vehicle.

3. The top as recited in claim 2, wherein the vehicle body includes a main bearing unit, and wherein the linkage includes a first main link and a second main link, the first and second main links each being pivotably connected to the vehicle body in a region of the main bearing unit.

4. The top as recited in claim 3, wherein the roof part, the first main link, the second main link and the vehicle body form a four-bar linkage.

5. The top as recited in claim 4, wherein the roof part includes a coupling link and a rigid shell part fixed on the coupling link.

6. The top as recited in claim 5, further comprising a front roof part, and wherein the front roof part, the coupling link and a first front roof link and a second front roof link together form a front four-bar linkage of the positively controlled linkage.

7. The top as recited in claim 6, further comprising a control link articulated on the second main link and two intermediate links, the front four-bar linkage being driveable using the control link and the two intermediate links.

8. The top as recited in claim 4, further comprising a front roof part and a sliding guide, the front roof part being moveable to a position over the of part using the sliding guide.

9. The top as recited in claim 8, wherein the sliding guide includes a rail fixed to the roof part and a plurality of front links, each front link being articulated on the front roof part and guided in the rail.

10. The top as recited in claim 1, wherein the link mechanism includes a three-dimensional coupling rod.

11. The top as recited in claim 1, wherein the rear window element is held movably relative to the roof part.

12. The top as recited in claim 11, further comprising a box-type receptacle disposed in the vehicle in a region behind a rear passenger region of the vehicle, the rear window element being displaceably mounted in the box-type receptacle.

13. The top as recited in claim 1, further comprising seals disposed on the pillar element and configured to seal the rear window element.

14. The top as recited in claim 1, further comprising a three-dimensional coupling rod connected to the pillar element.

* * * * *